Figure 1:
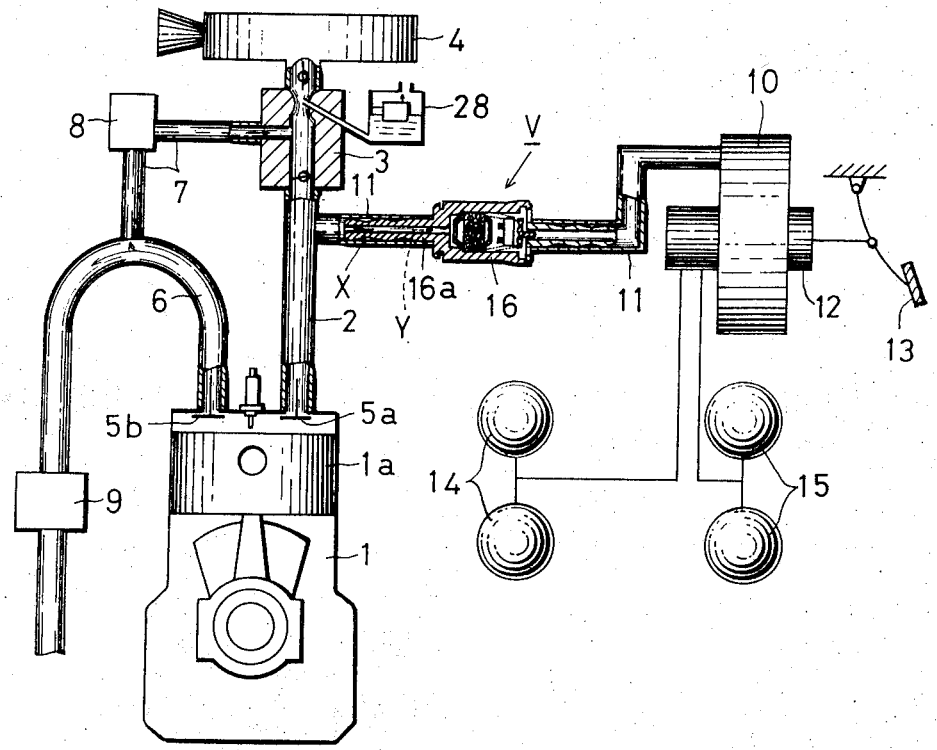

United States Patent [19]
Ishikawa et al.

[11] 3,835,884
[45] Sept. 17, 1974

[54] NEGATIVE PRESSURE CIRCUIT ARRANGEMENT HAVING A CHECK VALVE

[75] Inventors: Masakazu Ishikawa; Sadayoshi Itou, both of Toyota, Japan

[73] Assignee: Toyota Jidosha Kogyo Kabioshiki Kaisha, Toyota-shi, Japan

[22] Filed: Dec. 7, 1972

[21] Appl. No.: 312,930

[30] Foreign Application Priority Data
Sept. 11, 1972 Japan............................. 47-91124

[52] U.S. Cl.............................. 137/550, 137/543.23
[51] Int. Cl.............................................. F16k 15/06
[58] Field of Search...................... 137/543.23, 550; 60/54.6 P

[56] References Cited
UNITED STATES PATENTS

| | | | |
|---|---|---|---|
| 2,247,590 | 7/1941 | Strong............................. | 137/550 X |
| 2,532,462 | 12/1950 | Rockwell.......................... | 60/54.6 P |
| 2,642,261 | 6/1953 | Gates.............................. | 137/550 X |
| 2,655,041 | 10/1953 | Jacobsson....................... | 137/550 X |
| 2,752,942 | 7/1956 | Trevaskis........................ | 137/550 X |
| 2,896,663 | 7/1959 | Mena............................... | 137/550 X |
| 2,896,863 | 7/1959 | Shames et al................... | 137/550 X |
| 3,664,369 | 5/1972 | Johnson.......................... | 137/550 X |

FOREIGN PATENTS OR APPLICATIONS

| | | | |
|---|---|---|---|
| 573,144 | 3/1959 | Canada........................... | 60/54.5 P |

*Primary Examiner*—Henry T. Klinksiek
*Attorney, Agent, or Firm*—Stevens, Davis, Miller & Mosher

[57] ABSTRACT

A negative pressure generating arrangement for an operably associated internal combustion engine and booster brake system for a motor-vehicle, and more particularly, a check valve for use in such an arrangement to permit the flow of a clean fluid in one direction therethrough and prevent the flow of an impure fluid tending to flow therethrough in the opposite direction, the check valve including a filter for removing impurities from the impure fluid prior to its reaching a valve member to thereby maintain the valve member in a clean condition.

2 Claims, 2 Drawing Figures

NEGATIVE PRESSURE CIRCUIT ARRANGEMENT HAVING A CHECK VALVE

This invention relates generally to a negative pressure circuit arrangement for operably associated engine and brake mechanisms for a motor-vehicle, and more particularly, to a check valve adapted for use in such a negative pressure circuit arrangement and provided with a filter.

There is known in the art a check valve for use with a booster brake mechanism operably associated with an exhaust gas recirculation type internal combustion engine for a motor-vehicle. The valve member of this check valve is exposed to a gas containing such impurities as carbon and lead compounds when the operation of the engine is stopped or a back-fire has occurred in the engine. Such impurities are caught in the clearance between the valve member and the valve housing, and prevent the valve from performing its proper function, resulting in the malfunction of the booster brake, too.

This invention has been achieved with the above points in mind.

It is an object of this invention to provide a negative pressure circuit arrangement including a check valve adapted upon exposure to a fluid containing impurities to prevent such impurities from reaching a valve member and to maintain the arrangement in a properly operable condition.

It is another object of this invention to provide a negative pressure circuit arrangement including a check valve having a filter which is simple and compact in construction and inexpensive.

A principal feature of this invention lies in the provision of a filter in a check valve on that side of a valve member in which the valve member tends to be exposed to a gas containing impurities. This filter is adapted to retain such impurities thereon while allowing a clean gas to flow therethrough to the valve member, so that the valve member is always kept in a clean condition. This feature of the invention provides a most satisfactory solution to the above discussed problems involved in the prior art check valve, and is especially important in case a check valve is used in an exhaust gas recirculation type arrangement. The check valve according to this invention is always kept in a clean, properly operable condition, and accordingly, a booster brake associated with such a check valve is always maintained in a properly operable condition.

Figure 2:
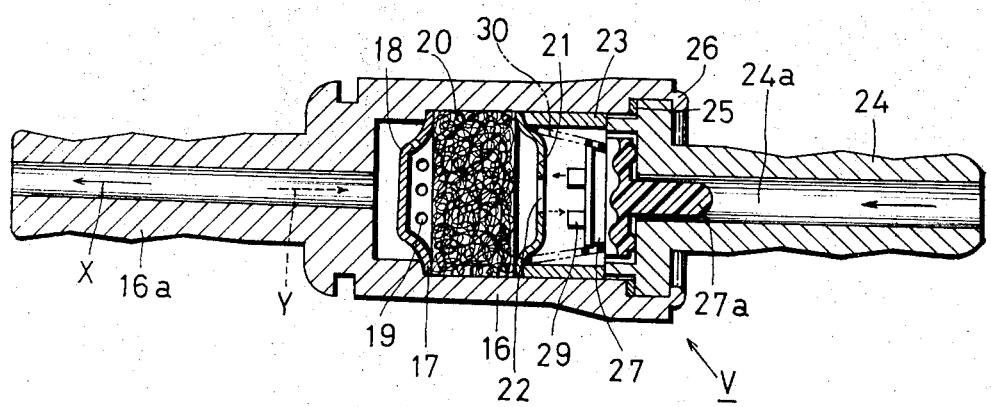

The foregoing and other objects and features of this invention will become more apparent from the following description, and the accompanying drawings, in which:

FIG. 1 is a diagramatical view of a preferred embodiment of the circuit arrangement according to this invention, showing schematically an exhaust gas recirculation type internal combustion engine for a motor-vehicle and a booster brake mechanism operably associated with the engine; and FIG. 2 is a vertical cross-sectional view of a preferred embodiment of the check valve according to this invention.

Referring now to FIG. 1 of the drawing, the exhaust gas recirculation type engime system of a motor-vehicle shown on the left-hand side thereof includes an engine cylinder 1 comprising a vertically movable piston 1a, a suction valve 5a and an exhaust valve 5b. A carburetor 3 is disposed to receive air through an air strainer 4 and fuel oil from a float chamber 28, causes the air and the fuel oil to be mixed by a negative pressure developed by the reciprocal movement of the piston 1a, and supplies the resultant air-fuel mixture into the cylinder 1 through an intake manifold 2 and the intake valve 5a. An exhaust manifold 6 is connected to the exit of the cylinder 1 with the exhaust valve 5b in between, and is adapted to receive the exhaust gas from the cylinder 1 through the exhaust valve 5b. A conduit 7 is provided with a solenoid valve 8 intermediate the ends thereof, and is connected at one end with the exhaust manifold 6 intermediate the ends of the latter to bypass a portion of the exhaust gas from the cylinder 1 into the carburetor 3. Provided on the exhaust manifold 6 beyond the bypass conduit 7 is a catalyst 9 for cleaning the remaining greater portion of the exhaust gas prior to discharge into the atmosphere.

Referring to the brake system shown on the right-hand side of FIG. 1, a servo-cylinder 10 of a booster brake comprises two chambers having different pressures, one of which is maintained at a negative pressure, while the other chamber is kept at atmospheric pressure. The pressure differential thus maintained between the two chambers is utilized to reduce the amount of the force required to actuate a brake pedal 13. Upon actuation of the brake pedal 13, a master cylinder 12 is actuated to operate front and rear brake wheels 14 and 15. A conduit 11 is disposed to connect the servo-cylinder 10 and the intake manifold 2 of the engine system, and is provided approximately mid-way with a check valve V adapted to develop a negative pressure in one chamber of the servo-cylinder 10 when a negative pressure is developed in the intake manifold 2.

Attention is now directed to FIG. 2 showing the check valve V in detail. The valve V comprises a housing 16 formed at one end with a tubular portion 16a for connection into the conduit 11 connected to the intake manifold 2. The valve housing 16 includes a shoulder 17 formed on the inner surface thereof in a position closer to the end formed with the tubular portion 16a, and the shoulder 17 defines a larger bore extending through the housing 16 toward the opposite end thereof. A support member 18 is situated within the bore of the housing 16, and the outer edge portion of the member 18 is pressed against the shoulder 17 in a closely sealed relationship therewith to prevent any leakage of the gas containing impurities through the clearance between the inner surface of the housing 16 and a filter 20 filling the space defined by the inner surface of the housing 16 and the member 18. The filter support member 18 is provided therethrough with a plurality of holes 19 to prevent any localized impingement of the impure gas against the adjacent face of the filter 20 and to cause the gas to scatter uniformly against the filter 20. A stop member 21 is positioned within the housing 16 on the opposite side of the filter 20 from the support member 18. In the particular embodiment of the invention as herein described, the filter 20 comprises a plurality of 0.15 mm dia. brass wires put together in the form of a net and pressed together to form a substantially cylindrical shape. But the filter may be prepared from any other material insofar as it can easily trap from the exhaust gas any impurities, such as carbon, soot and lead compounds, generated by a back-fire of the engine or any other cause. The stop member 21 is formed with a centrally disposed aperture 22. A cylindrical collar 23 is positioned beyond the stop member 21 in such a manner that one end of the collar 23 rests on the outer surface of the stop member 21, and the outer surface of the collar 23 is fitted against the inner surface of the housing 16. The inner surface of the housing 16 is formed adjacent the opposite end thereof with an outwardly recessed shoulder, and the outer end of the collar 23 terminates considerably inwardly of the shoulder. An annular gasket 25 is positioned against this shoulder. A tubular insert member 24 is formed at one end with a disc-shaped portion having a coaxial bore with its tubular portion, and an annular web extending in the opposite direction from the tubular portion and having a somewhat smaller outer diameter than the disc portion. The tubular insert member 24 is firmly connected at said one end into the housing 16 with its inner end disc portion resting on the gasket 25 and its annular web abutting against the outer end of the collar 23, and held in that position by caulking or turning the outermost edge 26 of the housing 16 over the outer periphery of the disc portion of the tubular insert member 24. The opposite or free end of the tubular insert member 24 is connected into the conduit 11 leading to the servo-cylinder 10 of the brake.

A valve member 27 is made of a resilient material such as rubber, and positioned at the inner end of the tubular insert member 24 enclosed within the housing 16. The valve member 27 is provided with a relatively elongated projection 27a extending outwardly into the longitudinal bore 24a of the tubular insert member 24. A helical spring 30 is positioned between the stop member 21 and the valve member 27 to normally urge the valve member 27 against the inner end of the tubular insert member 24 and to maintain the inner end opening of the tubular insert member 24 in its closed position. The valve member 27 is also provided with a plurality of relatively small projections 29 on the opposite side of the elongated projection 27a. The projections 29 are provided to abut against the stop member 21 when the valve member 27 is urged toward the stop member 21 by overcoming the resistance of the spring 30, and to maintain a proper clearance between the stop member 21 and the valve member 27 and to keep the central opening 22 of the stop member 21 in its open position. The valve member 27 has a hardened surface obtained by a gasoline-resistant halogenating treatment.

In operation of the engine is started, and air entering through the air strainer 4 and gasoline from the float chamber 28 are mixed in the carburetor 3. The air-fuel mixture thus obtained flows down through the intake manifold 2 at a high velocity, and enters the cylinder 1 through the suction valve 5a. Combustion takes place in the cylinder 1, and the resultant waste gas flows out through the exhaust valve 5b into the exhaust manifold 6. A portion of the exhaust gas is bypassed into the conduit 7, and recirculated through the solenoid valve 8 into the carburetor 3 and then through the intake manifold 2 into the cylinder 1, where the recirculated gas is burned again with a fresh air-fuel mixture, while the rest of the exhaust gas is discharged into the open air after it has been cleaned through the catalyst 9. Thus, the most important feature of the exhaust gas recirculation type engine well known in the art resides in the recirculation of a portion of the exhaust gas from the engine cylinder to the inlet side of the cylinder to admix it with a fresh air-fuel mixture in order to lower the combustion temperature of the air-fuel mixture and reduce the nitrogen oxide contents in the combustion products.

Turning now to a feature of this invention, a negative pressure develops in the intake manifold 2 when the air-fuel mixture has flowed therethrough at a high velocity. Since the intake manifold 2 is in open communication with the tubular portion 16a of the check valve V, the pressure of the tubular portion 16a also becomes negative. As on the other hand the pressure of the tubular insert member 24 on the opposite side of the valve is at a positive level, the valve member 27 is urged in the direction of the arrow X toward the stop member 21 by overcoming the resistance of the helical spring 30. Thus, as long as such pressure differential exists on the opposite sides of the valve member 27, the inner end opening of the tubular insert member 24 is kept in its open position permitting communication between the tubular insert member 24 and the valve housing 16 to cause the servo-cylinder 10 of the booster brake to suck air thereinto and maintain in the booster brake a negative pressure required for its proper function.

When the engine operation is stopped, the air-fuel mixture ceases to enter the cylinder 1, resulting in the elevation of the pressure in the intake manifold 2. Accordingly, the exhaust gas containing impurities and remaining in the conduit 7, the carburetor 3 and the intake manifold 2 flows into the conduit 11 toward the check valve V in the direction of the arrow Y. After it has entered the valve housing 16, the exhaust gas flows through the apertures 19 of the member 18 into the filter 20, by which the impurities contained in the exhaust gas are removed, and the clean gas passed through the filter 20 flows against the valve member 27. This clean gas exerts an additional force urging the valve member 27 against the inner end of the tubular insert member 24 which is already in its closed position by virtue of the force of the helical spring 30, so that any flow of such gas to the brake side of the valve V is completely prevented.

It will be obvious that the check valve V will also work exactly as described above when the pressure elevation in the intake manifold 2 is due to occurrence of a back-fire or any other cause. It will be understood that though in the embodiment as hereinabove described the filter 20 has been positioned within the valve housing 16, it may be positioned in any other location between the intake manifold 2 and the valve member 27.

What is claimed is:

1. A check valve assembly comprising:
   a cylindrical housing;
   closure means provided at each end of said cylindrical housing and having a bore opening into said cylindrical housing;
   a valve member positioned in said cylindrical housing and adapted to permit the flow of a first fluid tending to flow therethrough in one direction but prevent the flow of a second fluid tending to flow in the opposite direction;
   a filter made of metal fibers and positioned on one side of said valve member closer to a negative pressure generating source;
   filter supporting means having a plurality of holes to pass the flow of said first and second fluids therethrough and positioned at one end of said filter, the outer peripheral edge of said filter supporting means being held against the inner surface of said cylindrical housing in a tightly sealed relationship therewith to prevent any bypassing of said second fluid around said filter through the clearance between said filter and the inner surface of said cylindrical housing;

stopper means provided with an opening centrally therethrough and positioned at the opposite end of said filter;

and spring means positioned between said valve member and said stopper means for urging said valve member resiliently against said closure means at the adjacent end of said cylindrical housing.

2. In a negative pressure circuit arrangement provided between an engine intake manifold including exhaust gas recirculating means for purification of exhaust gas and a booster brake system operable by the negative pressure generated in said intake manifold, said arrangement having a check valve including a valve member positioned in a housing and adapted to permit the flow of a fluid therethrough in the direction from said brake system to said intake manifold but to prevent any flow therethrough in the opposite direction, the improvement comprising filter means provided within said housing in a position between said valve member and said intake manifold to remove any impurities existing in a fluid flowing from said intake manifold to said valve member; means for supporting said filter means adjacent to the end thereof which is closer to said intake manifold, said supporting means being provided therethrough with a plurality of holes to permit the flow of a fluid therethrough into said filter means; and stopper means for said valve member positioned on the opposite side of said filter means from said supporting means and provided with an opening.

* * * * *

UNITED STATES PATENT OFFICE
CERTIFICATE OF CORRECTION

PATENT NO. : 3,835,884
DATED : September 17, 1974
INVENTOR(S) : Masakazu ISHIKAWA et al It is certified that error appears in the above-identified patent and that said Letters Patent are hereby corrected as shown below:

The correct name of the Assignee is

--TOYOTA JIDOSHA KOGYO KABUSHIKI KAISHA--.

Column 1, line 64, change "engime" to --engine--.

Signed and Sealed this seventh Day of October 1975

[SEAL]

Attest:

RUTH C. MASON
Attesting Officer

C. MARSHALL DANN
Commissioner of Patents and Trademarks